United States Patent
Chung

(10) Patent No.: US 8,204,898 B2
(45) Date of Patent: Jun. 19, 2012

(54) MULTI-SITE COMMON DIRECTORY AND METHOD FOR USING THE MULTI-SITE COMMON DIRECTORY

(75) Inventor: Bason Chung, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1408 days.

(21) Appl. No.: 11/670,469

(22) Filed: Feb. 2, 2007

(65) Prior Publication Data
US 2008/0189248 A1    Aug. 7, 2008

(51) Int. Cl.
*G06F 7/00* (2006.01)
*G06F 17/00* (2006.01)
*G06F 17/30* (2006.01)
(52) U.S. Cl. ........ 707/769; 707/784; 707/828; 709/219; 709/229; 711/118
(58) Field of Classification Search .................. None
See application file for complete search history.

(56) References Cited

U.S. PATENT DOCUMENTS

| 6,934,701 B1 | 8/2005 | Hall, Jr. ............ 707/2 |
| 7,366,786 B2 * | 4/2008 | Lim et al. ......... 709/229 |
| 2006/0122983 A1 * | 6/2006 | King et al. ........ 707/3 |
| 2007/0027671 A1 * | 2/2007 | Kanawa ............ 704/4 |

FOREIGN PATENT DOCUMENTS

| EP | 0 772 139 A2 | 5/1997 |
| EP | 0 876 029 A2 | 11/1998 |
| EP | 0 926 608 A2 | 6/1999 |
| EP | 1 130 869 A1 | 9/2001 |
| WO | 02/45344 A2 | 6/2002 |
| WO | 02/067602 A1 | 8/2002 |

OTHER PUBLICATIONS

International Search Report for PCT/IB2008/050374 dated Jul. 11, 2008.

* cited by examiner

*Primary Examiner* — Loan T Nguyen
(74) *Attorney, Agent, or Firm* — Dilip C. Andrade

(57) ABSTRACT

A common directory and method are described herein that maintains and accesses multiple subscriber profiles by using a directory service logic, a search/index database (which contains subscriber search keys for all of the subscribers in a communication network) and a local profile database (which contains the subscriber profiles for only the local subscribers in the communication network).

19 Claims, 9 Drawing Sheets

MULTI-SITE COMMON DIRECTORY AND METHOD FOR USING THE MULTI-SITE COMMON DIRECTORY

TECHNICAL FIELD

The present invention relates to a common directory that maintains and accesses multiple subscriber profiles by using a directory service logic, a search/index database (which contains subscriber search keys for all of the subscribers in a communication network) and a local profile database (which contains the subscriber profiles for only the local subscribers in the communication network).

BACKGROUND

The following abbreviations are herewith defined, at least some of which are referred to within the ensuing description of the prior art and the present invention.
IMS IP Multimedia Subsystem
IP Internet Protocol
ISDN Integrated Services Digital Network
LAN Local Area Network
LDAP Lightweight Directory Access Protocol
MMS Multimedia Message Service
MS Messaging/Traffic Server
MSISDN Mobile Subscriber ISDN Number
SMS Short Message Service
SIP Session Initiation Protocol
URI Uniform Resource Identifier
URL Uniform Resource Locator
XML Extensible Markup Language
WAN Wide Area Network In the communications field, a network upon receiving a message such as a MMS, IMS, SMS or email etc. . . . often determines how to process/forward the message by accessing a subscriber profile which contains information regarding message authorization preferences and/or handling preferences (i.e., forward destination, storage preference, blocking preference). For instance, a subscriber may want emails which are sent to them to be forwarded to one email address on a certain day of the week and forwarded to another email address on another day of the week and they would have this handling preference stored in their subscriber profile. Or, the subscriber may want to block an email from being forwarded to them that was sent by a certain person and they would have this blocking preference stored in their subscriber profile. To enable these preferences, the network uses a multi-site common directory which stores the subscriber profiles for all of their subscribers. The multi-site common directory is made-up of many individual common directories where one common directory typically supports one metropolitan area and another common directory supports another metropolitan area and so on . . . . The individual common directories are connected to one another via IP links on a WAN. Examples of two prior art multi-site common directories 100 and 200 are discussed next with respect to FIGS. 1 and 2.

Referring to FIG. 1 (PRIOR ART), there is a block diagram illustrating one prior art implementation of a multi-site common directory 100 where each common directory 102a, 102b, 102c and 102d (shown at sites A, B, C and D) has their own subscriber database 104 which stores the subscriber profiles for all of the network's subscribers. One disadvantage of this particular implementation is that each common directory 102a, 102b, 102c and 102d needs to store and index a large number of subscriber profiles within their particular database 104. Another disadvantage is that each common directory 102a, 102b, 102c and 102d utilizes a lot of bandwidth on the IP links in the WAN to replicate all of the subscriber data in the other databases 104 (i.e., each database 104 contains a current copy of the subscriber profiles for everyone of the network's subscribers).

Referring to FIG. 2 (PRIOR ART), there is a block diagram illustrating another prior art implementation of a multi-site common directory 200 where a single centralized subscriber database 204 is accessed by all of the common directories 202a, 202b, 202c and 202d (shown at sites A, B, C and D) (note: the common directory 202a contains the centralized subscriber database 204 in this example). An advantage of this particular implementation is that not all of the common directories 202b, 202c and 202d need to have and maintain subscriber databases that store and replicate all of the subscriber profiles (see FIG. 1). However, a disadvantage of this particular implementation is that large broadband connections are required between the common directory 202a which has the centralized subscriber database 204 and the common directories 202b, 202c and 202d. Another disadvantage is that it can take additional time for the remote common directories 202b, 202c and 202d to access the centralized subscriber database 204 (note: networks can use a combination of the two different multi-site directories 100 and 200 but this combination would still have the aforementioned drawbacks). These problems and other problems are satisfied by the present invention.

SUMMARY

A common directory and method are described herein that can maintain and accesses multiple subscriber profiles by using a directory service logic, a search/index database (which contains subscriber search keys for all of the subscribers in a communication network) and a local profile database (which contains the subscriber profiles for only the local subscribers in the communication network). In one embodiment, the common directory includes the directory service logic interfaces with both the search index storage unit and the local profile storage unit to maintain and access multiple subscriber profiles. In this embodiment, the search index storage unit stores subscriber search keys for all subscribers and the stored subscriber search keys are automatically replicated at remote search index storage units which are associated with other common directories. Whereas, the local profile storage unit stores subscriber profiles for a portion of the subscribers and the stored subscriber profiles are not automatically replicated at remote local profile storage units which are associated with the other common directories.

In another embodiment, the common directory performs the following steps: (a) storing subscriber search keys for all subscribers within a search index storage unit, where the stored subscriber search keys are automatically replicated at remote search index storage units which are associated with other common directories; and (b) storing subscriber profiles for a portion of the subscribers within a local profile storage unit, where the stored subscriber profiles are not automatically replicated at remote local profile storage units which are associated with the other common directories.

In addition, a multi-site common directory is described herein which has a first common directory and a second common directory. The first common directory includes: (a) a first directory service logic; (b) a first search index storage unit adapted to store subscriber search keys of all subscribers in a network; and (c) a first local profile storage unit adapted to store profiles of a first portion of all subscribers in the network. The second common directory includes: (a) a second directory service logic; (b) a second search index storage unit adapted to store subscriber search keys of all subscribers in a network; and (c) a second local profile storage unit adapted to store profiles of a second portion of all subscribers in the network.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 1:
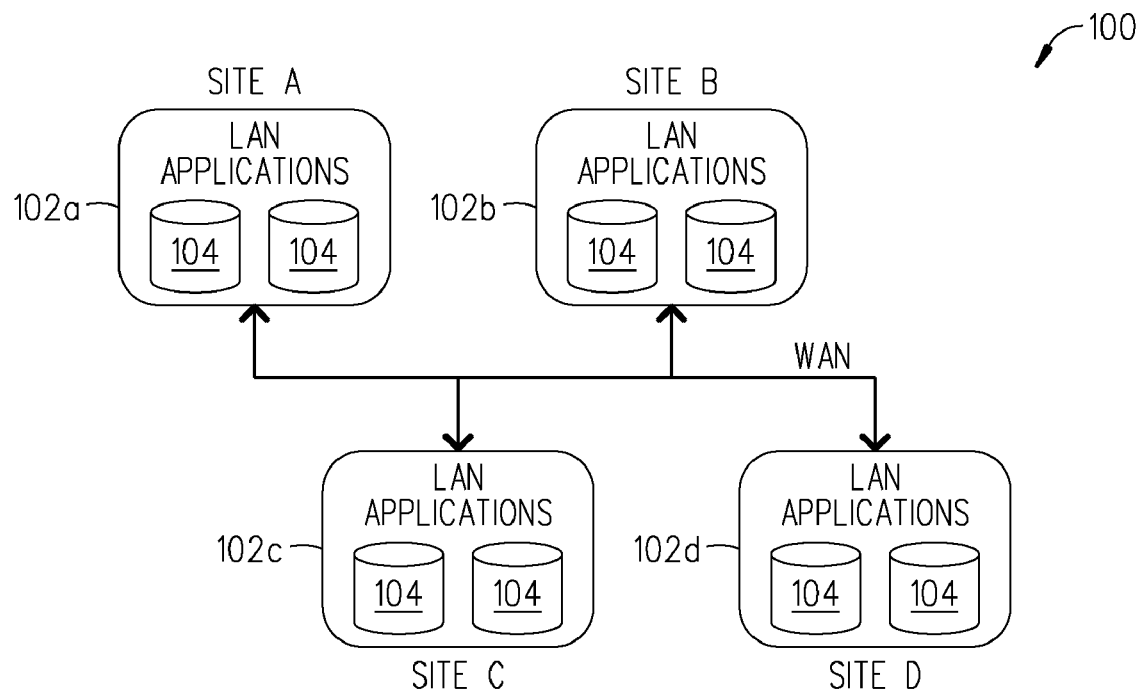
FIG. 1 (PRIOR ART) is a block diagram illustrating a traditional multi-site common directory.
Figure 2:
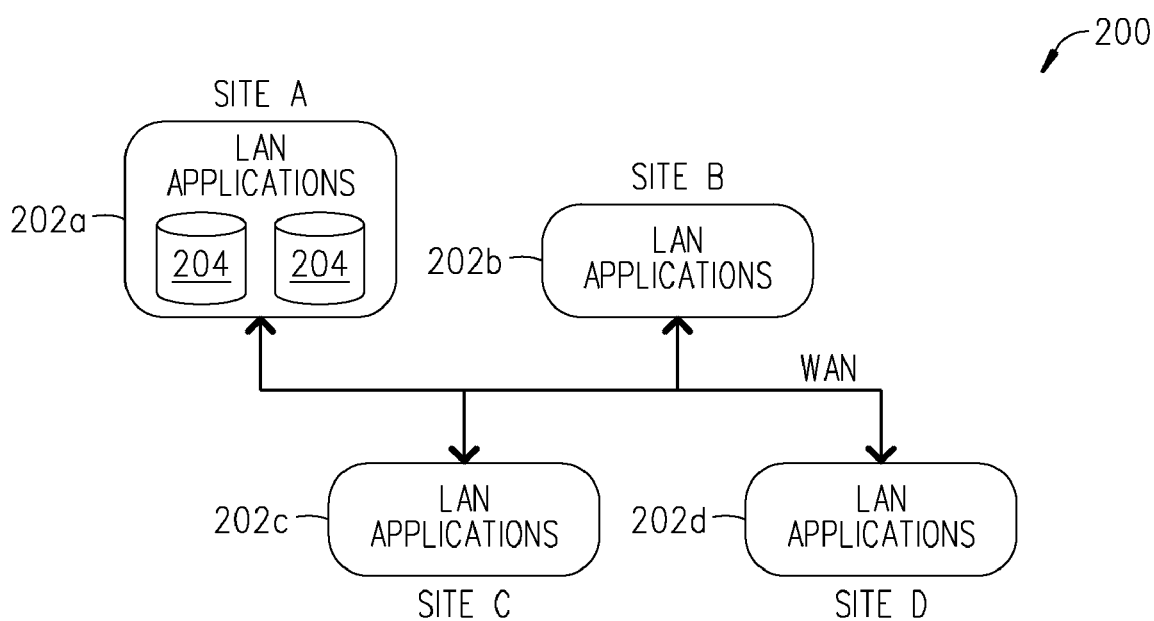
FIG. 2 (PRIOR ART) is a block diagram illustrating another traditional multi-site common directory.
Figure 3:
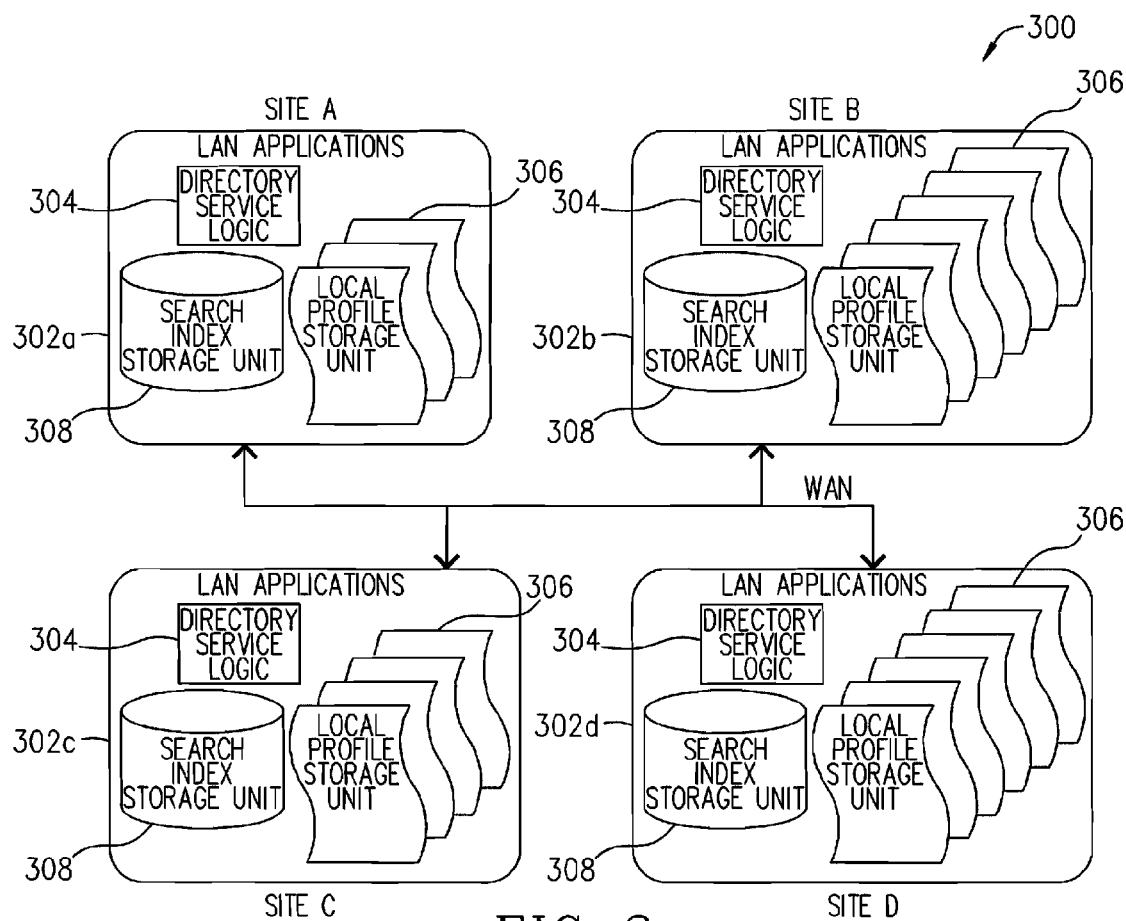
FIG. 3 is a block diagram illustrating an exemplary multi-site common directory which has multiple common directories (shown at sites A, B, C and D) each of which implements a distributed subscriber database architecture in accordance with the present invention.

Referring to FIG. 3, there is a block diagram illustrating an exemplary multi-site common directory 300 which is made-up of multiple common directories 302a, 302b, 302c and 302d (shown at sites A, B, C and D) each of which has a distributed subscriber database architecture in accordance with the present invention (note: the multi-site common directory 300 can be made-up of any number of common directories 302a, 302b, 302c . . . 302n). As shown, each common directory 302a, 302b, 302c and 302d includes a directory service logic 304, a local profile storage unit 306 and a search index storage unit 308. Basically, each directory service logic 304 accesses and maintains subscriber profile data that is split between its respective local profile storage unit 306 and a search index storage unit 308 (see FIGS. 5-14). And, each local profile storage unit 306 contains the entire subscriber profile for the corresponding local subscribers in the network. While, each search index storage unit 308 contains subscriber search keys which are used to identify all of the subscribers in the network. The subscriber search keys can include the following (for example)

Path: <local profile path>
Last update URL (with timestamp)
MSISDN
Second MSISDN
SIP URI
Email address
Alternative email address
Billing Number
Number portability number
Etc.

In the present invention, the search index storage unit 308 is replicated between all of the common directories 302a, 302b, 302c and 302d (i.e., all of the search index storage units 308 contain the same information for all of the network's subscribers). The amount of data that would normally be stored and replicated in each of the search index storage units 308 is expected to be only a fraction, e.g., 5% of all the subscriber profile data and is also expected to be relatively static data so it can be searched very fast. The rest of the subscriber profile data is stored and updated locally within the local profile storage unit 306. In this case, the subscriber profile data that is stored within the local profile storage unit 306 is not automatically replicated between the common directories 302a, 302b, 302c and 302d (note: the local profile storage units 306 will not contain the same information). Instead, each local profile storage unit 306 contains the entire subscriber profile for each of the local subscribers (i.e., subscribers located in their home area or roaming subscribers). However, the full subscriber profile for a particular subscriber can be dynamically moved and/or copied from/to different local profile storage units 306 in accordance with the present invention if the interrogated local profile storage unit 306 does not contain a subscriber profile or the subscriber profile is obsolete for a particular subscriber (see FIGS. 5-14).

Figure 4:
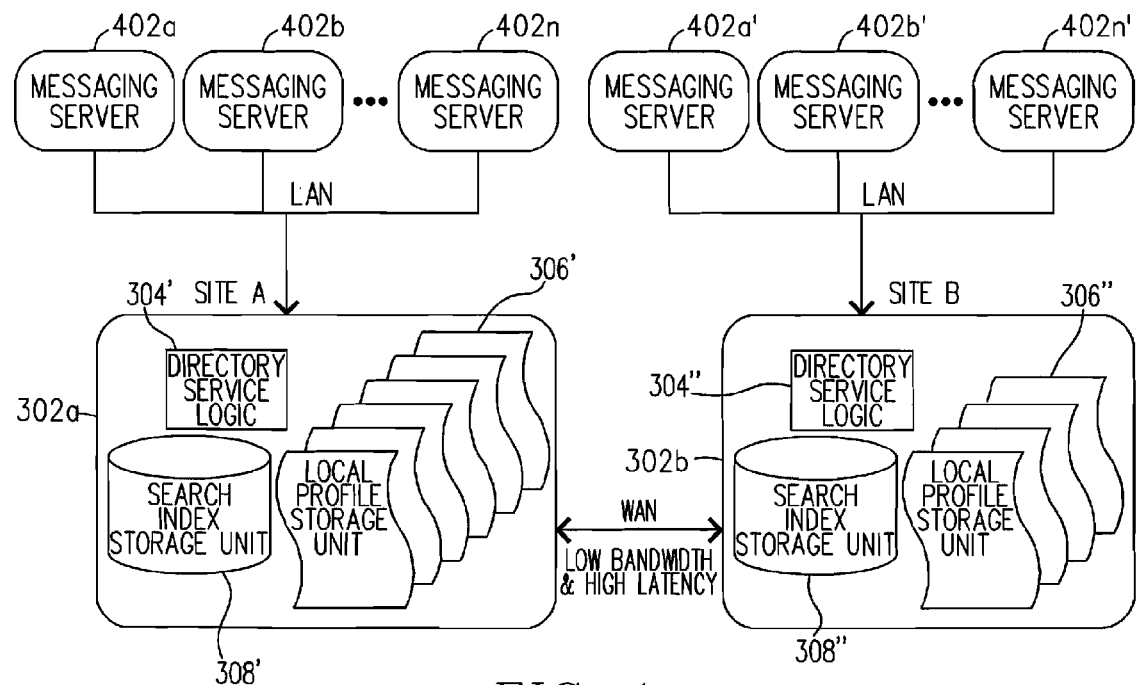
FIG. 4 is a block diagram illustrating in greater detail two of the aforementioned common directories (associated with sites A and B) which are used to help explain some of the different features of the present invention.

Referring to FIG. 4, there is a block diagram illustrating two of the exemplary common directories 302a and 302b (associated with sites A and B) which are used hereinafter to help explain in detail some of the different features of the present invention. As shown, each common directory 302a and 302b respectively includes a directory service logic 304' and 304", a local profile storage unit 306' and 306" and a search index storage unit 308' and 308". Plus, each common directory 302a and 302b is respectively connected via a LAN to one or more messaging servers 402a, 402b . . . 402n and 402a', 402b' . . . 402n'. The messaging servers 402a, 402b . . . 402n and 402a', 402b' . . . 402n' can be email servers, voice servers, MMS servers, SMS servers, IMS servers etc. . . . In practice, the messaging servers 402a, 402b . . . 402n and 402a', 402b' . . . 402n' interact with their corresponding common directory 302a and 302b to perform: (1) a look-up operation (where a subscriber's profile is accessed to determine how to process/forward an incoming message (email, IMS, SMS, voice mail . . . ) which is being sent to a particular subscriber); and (2) a create/delete/update operation (where a particular subscriber's profile is created/deleted/updated by an administrator or their respective subscriber). Each of these operations and different variations thereof are discussed in greater detail below with respect to the signal flow diagrams shown in FIGS. 5-14).

Figure 5:
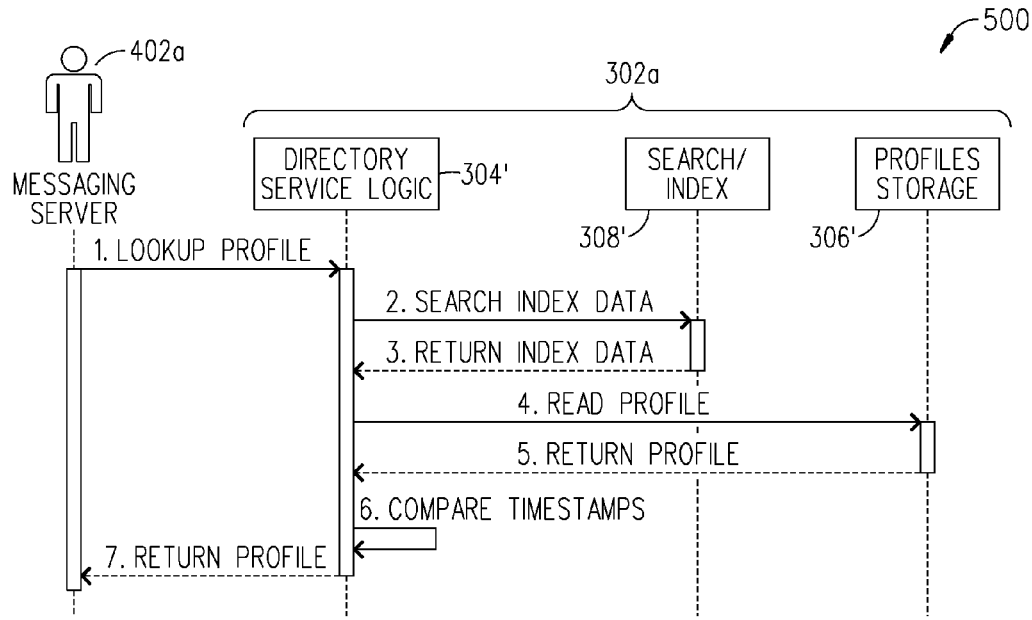
FIGS. 5-8 are four signal flow diagrams which are used to help explain a scenario where a messaging server wants to retrieve a particular subscriber profile and interacts with a common directory which looks-up or attempts to look-up that particular subscriber profile in accordance with several different embodiments of the present invention.

Referring to FIG. 5, there is illustrated a signal flow diagram 500 which is used to help explain a scenario where a messaging server 402a (for example) wants to retrieve a particular subscriber profile and interacts with a common directory 302a (for example) which looks-up that particular subscriber profile in accordance with one embodiment of the present invention. In this embodiment, the messaging server 402a upon receiving an incoming message (email, IMS, SMS, voice mail . . . ) for a particular subscriber sends a look-up profile request which contains a subscriber search key (e.g., the email address of the particular subscriber) to the directory service logic 304' (step 1). Then, the directory service logic 304' sends the subscriber search key (e.g., the subscriber's email address) to the search index storage unit 308' (step 2). The search index storage unit 308' takes the subscriber search key and performs a search to obtain subscriber search index data which includes at least: (1) a local profile path (which indicates where the full subscriber profile is stored in the local profile storage unit 306'); and (2) a last update URL with a time stamp (which indicates the particular local profile storage unit 306 and the last time the full subscriber profile was accessed or updated in that particular local profile storage unit 306) (note: the particular local profile storage unit 306 can be the local profile storage unit 306' or anyone of the remote local profile storage units 306"). The search index storage unit 308' sends the search index data (local profile path, last update URL etc. . . . ) to the directory service logic 304' (step 3). The directory service logic 304' sends a read request (including the local profile path) to the local profile storage unit 306' (step 4). The local profile storage unit 306' uses the local profile path to access the subscriber profile and then sends the retrieved subscriber profile (including a last profile timestamp which indicates the last time this particular subscriber profile was modified) to the directory service logic 304' (step 5). The directory service logic 304' then compares the timestamp in the last update URL (received from the search index storage unit 308') and the last profile timestamp (received from the local profile storage unit 306') to determine if the data in the returned subscriber profile is the most recent data (step 6). In this example, assume the subscriber profile retrieved from the local profile storage unit 306' is the most recent data because the last profile timestamp is newer than the last update URL timestamp (see FIG. 7 for an example where the retrieved subscriber profile is not the most recent data). Then, the directory service logic 304' returns the requested subscriber profile to the messaging server 402a' (step 7). Thereafter, the messaging server 402a' uses the subscriber profile to determine how or even if the incoming message is to be forwarded to the particular subscriber.

Figure 6:
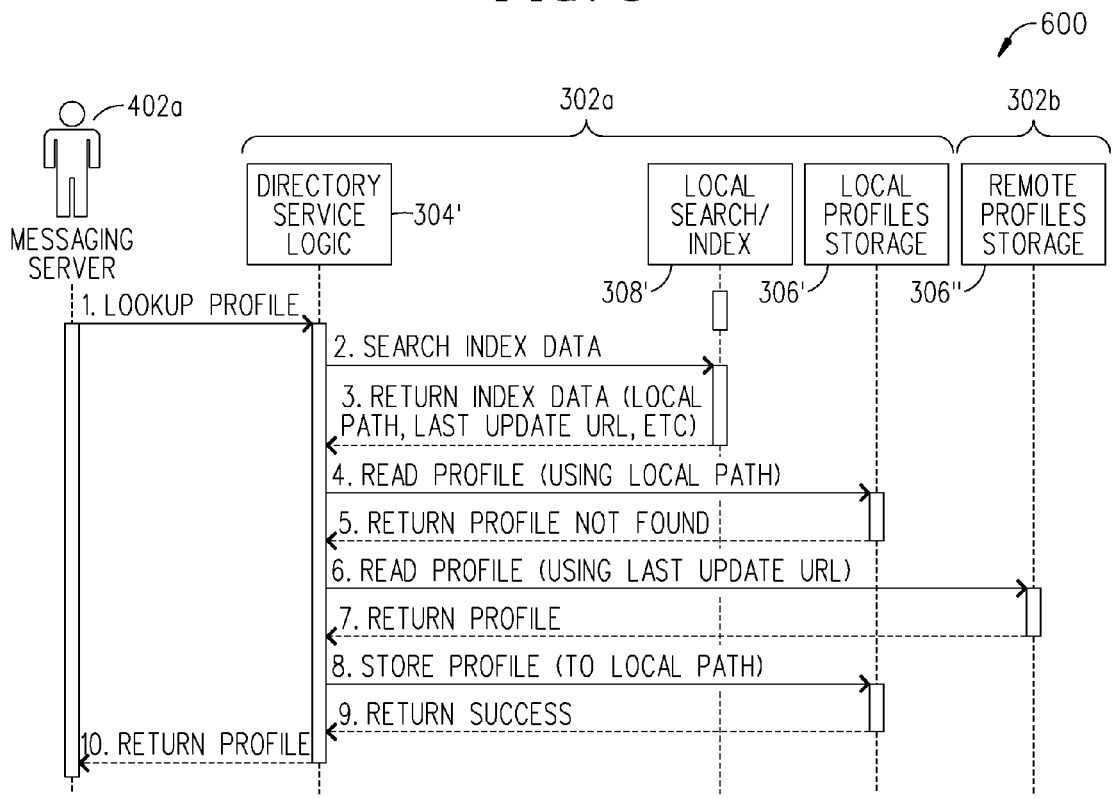

Referring to FIG. 6, there is illustrated a signal flow diagram 600 which is used to help explain a scenario where a messaging server 402a (for example) wants to retrieve a particular subscriber profile and interacts with a common directory 302a (for example) which looks-up that particular subscriber profile in accordance with another embodiment of the present invention. In this embodiment, the messaging server 402a upon receiving an incoming message (email, IMS, SMS, voice mail . . . ) for a particular subscriber sends a look-up profile request which contains a subscriber search key (e.g., the email address of the particular subscriber) to the directory service logic 304' (step 1). Then, the directory service logic 304' sends the subscriber search key (e.g., the subscriber's email address) to the search index storage unit 308' (step 2). The search index storage unit 308' takes the subscriber search key and performs a search to obtain subscriber search index data which includes at least a local profile path and a last update URL with a time stamp. The search index storage unit 308' sends the subscriber search index data (including the local profile path, last update URL etc. . . . ) to the directory service logic 304' (step 3). The directory service logic 304' sends a read request (including the local profile path) to the local profile storage unit 306' (step 4). The local profile storage unit 306' uses the local profile path in an attempt to access the subscriber profile but for whatever reason there is no stored subscriber profile for that particular subscriber (i.e., the subscriber has recently roamed into this particular coverage area). In this case, the local profile storage unit 306' sends a return message to the directory service logic 304' indicating that it does not have the desired subscriber profile (step 5). Then, the directory service logic 304' sends a read request (including the last update URL) to the corresponding remote local profile storage unit 306" (note: the last update URL identifies this remote local profile storage unit 306" as being the one in which the latest version of the subscriber profile is stored) (step 6). The remote local profile storage unit 306" uses the last update URL to access the subscriber profile and then sends the retrieved subscriber profile to the directory service logic 304' (step 7). The directory service logic 304' sends a store request (including the local profile path) requesting that the retrieved subscriber profile be stored in the local profile storage unit 306' (step 8). The local profile storage unit 306' stores the subscriber profile and then sends an indication that the subscriber profile has been successfully stored to the directory service logic 304' (step 9). Then, the directory service logic 304' returns the requested subscriber profile to the messaging server 402a' (step 10). Thereafter, the messaging server 402a' uses the subscriber profile to determine how or even if the incoming message is to be forwarded to the particular subscriber.

Figure 7:
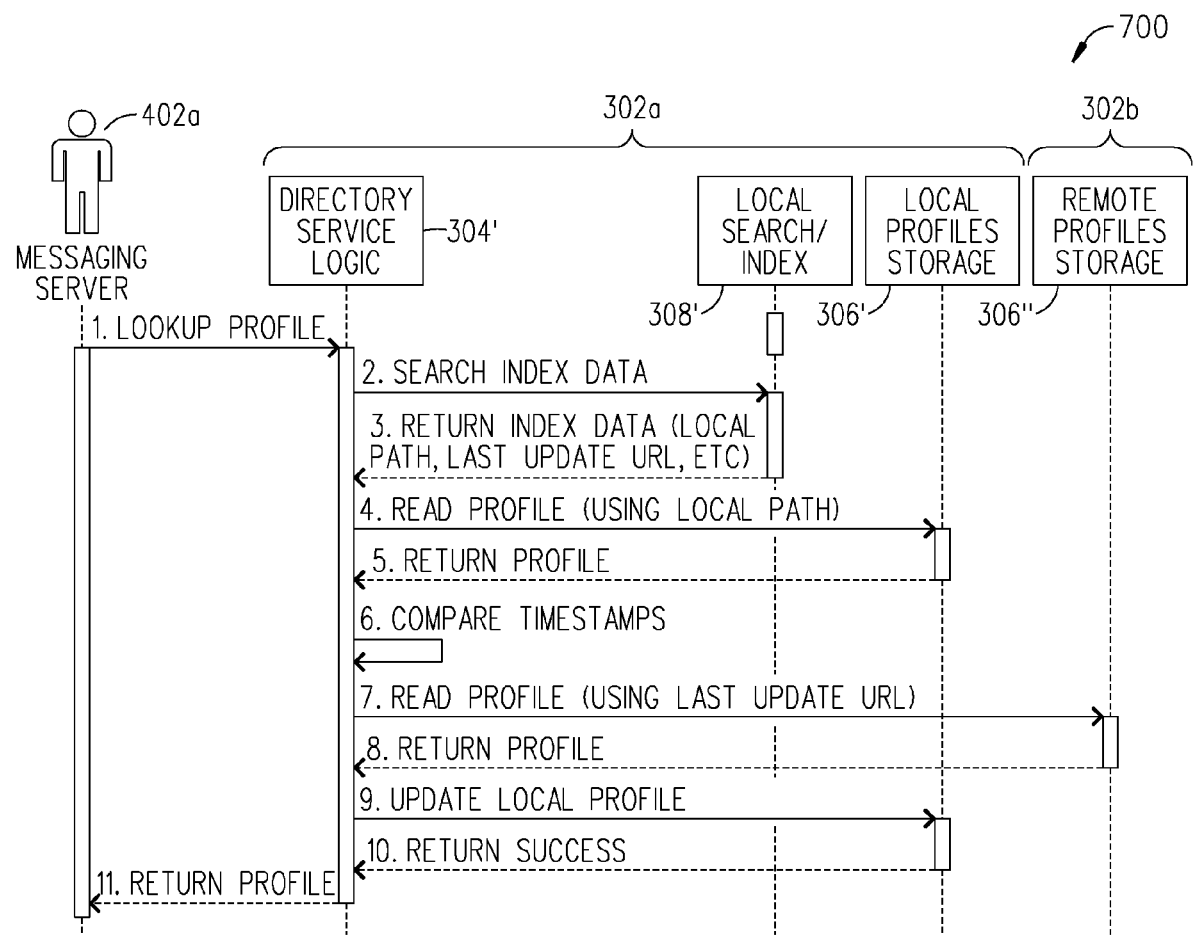

Referring to FIG. 7, there is illustrated a signal flow diagram 700 which is used to help explain a scenario where a messaging server 402a (for example) wants to retrieve a particular subscriber profile and interacts with a common directory 302a (for example) which looks-up that particular subscriber profile in accordance with another embodiment of the present invention. In this embodiment, the messaging server 402a upon receiving an incoming message (email, IMS, SMS, voice mail . . . ) for a particular subscriber sends a look-up profile request which contains a subscriber search key (e.g., the email address of the particular subscriber) to the directory service logic 304' (step 1). Then, the directory service logic 304' sends the subscriber search key (e.g., the subscriber's email address) to the search index storage unit 308' (step 2). The search index storage unit 308' takes the subscriber search key and performs a search to obtain subscriber search index data which includes at least a local profile path and a last update URL with a time stamp. The search index storage unit 308' sends the subscriber search index data (local profile path, last update URL etc.) to the directory service logic 304' (step 3). The directory service logic 304' sends a read request (including the local profile path) to the local profile storage unit 306' (step 4). The local profile storage unit 306' uses the local profile path to access the subscriber profile and then sends the retrieved subscriber profile (including a last profile timestamp) to the directory service logic 304' (step 5) (note: the local profile storage unit 306' can also send or provide access only to the last profile timestamp). Then, the directory service logic 304' compares the timestamp in the last update URL (received from the search index storage unit 308') and the last profile timestamp (received from the local profile storage unit 306') to determine if the data in the returned subscriber profile is the most recent data (step 6). In this example, assume the last profile timestamp is older than the last update URL timestamp which indicates the retrieved subscriber profile is not the most up to date subscriber profile. Then, the directory service logic 304' sends a read request (including the last update URL) to the corresponding remote local profile storage unit 306" (note: the last update URL identifies this remote local profile storage unit 306" as being the one in which the latest version of the subscriber profile is stored) (step 7). The remote local profile storage unit 306" uses the last update URL to access the subscriber profile and then sends the newer version of the subscriber profile to the directory service logic 304' (step 8). The directory service logic 304' sends an update request (including the local profile path) requesting that the newer version of the subscriber profile be stored in the local profile storage unit 306' (step 9). The local profile storage unit 306' stores the newer version of the subscriber profile and then sends an indication that the newer version of the subscriber profile has been successfully stored to the directory service logic 304' (step 10). Then, the directory service logic 304' returns the newer version of the subscriber profile to the messaging server 402a' (step 11). Thereafter, the messaging server 402a' uses the newer version subscriber profile to determine how or even if the incoming message is to be forwarded to the particular subscriber.

Figure 8:
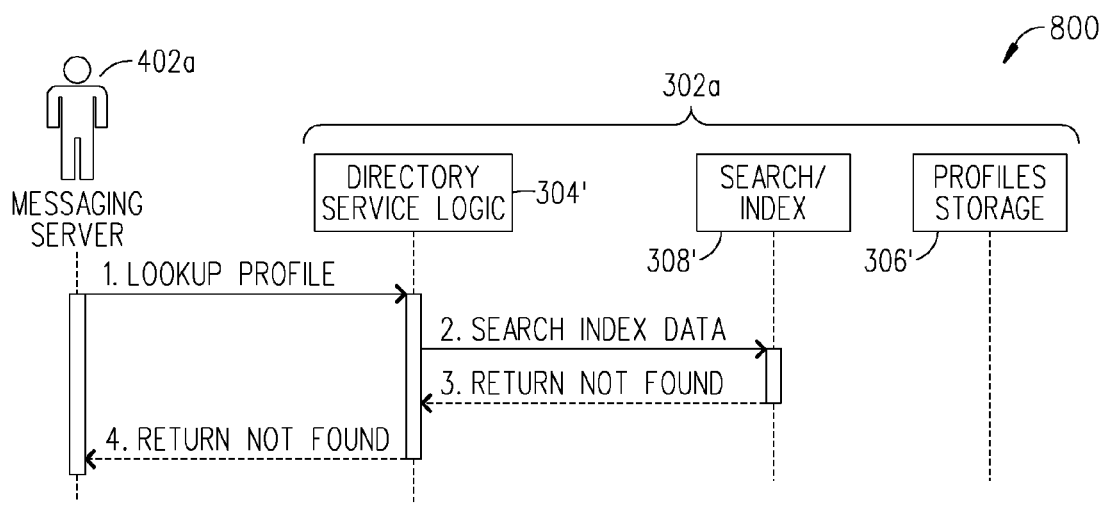

Referring to FIG. 8, there is illustrated a signal flow diagram 800 which is used to help explain a scenario where a messaging server 402a (for example) wants to retrieve a particular subscriber profile and interacts with a common directory 302a (for example) which attempts to look-up that particular subscriber profile in accordance with another embodiment of the present invention. In this embodiment, the messaging server 402a upon receiving an incoming message (the email, IMS, SMS, voice mail . . . ) for a particular subscriber sends a look-up profile request which contains a subscriber search key (e.g., the email address of the particular subscriber) to the directory service logic 304' (step 1). Then, the directory service logic 304' sends the subscriber search key (e.g., the subscriber's email address) to the search index storage unit 308' (step 2). The search index storage unit 308' performs a search based on the subscriber search key and assume in this case it can not find any search index data associated with that particular subscriber. Then, the search index storage unit 308' would send an indication that no search data was found to the directory service logic 304'. In response, the directory service logic 304' sends a message indicating that there is no subscriber profile to the messaging server 402a. Thereafter, the messaging server 402a would likely reply back to the sender of the incoming mail that the message can not be forwarded to the desired recipient.

Figure 9:
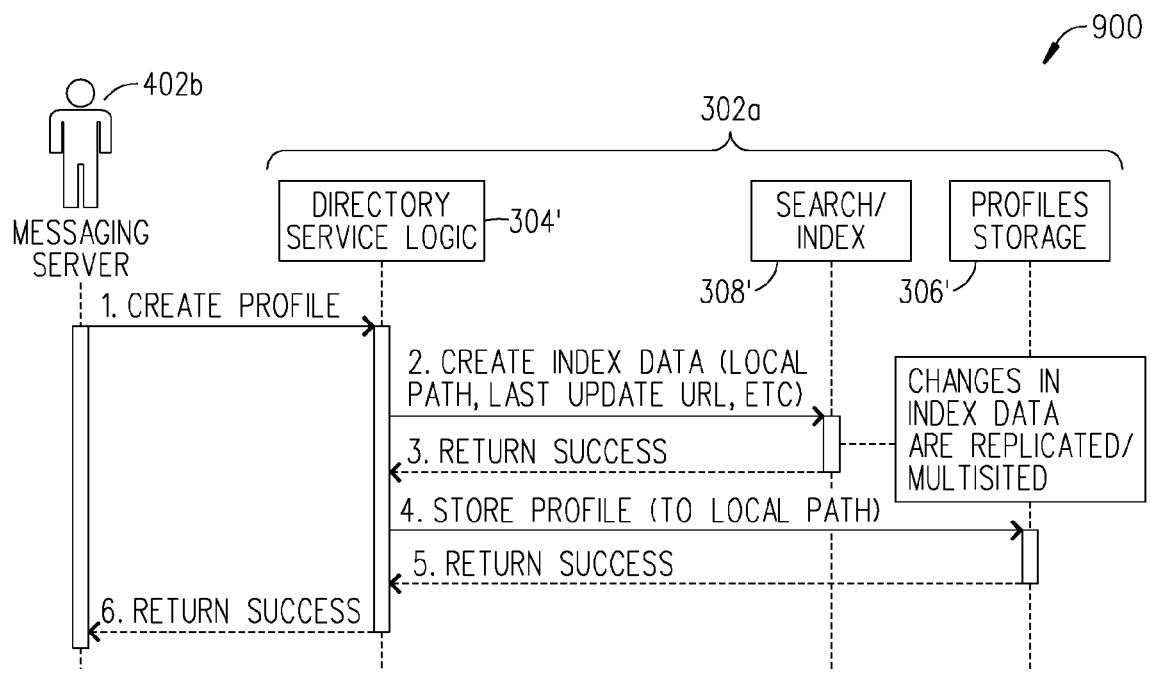
FIGS. 9-10 are two signal flow diagrams which are used to help explain a scenario where a messaging server wants to create a subscriber profile and interacts with a common directory which creates or attempts to create the subscriber profile in accordance with several different embodiments of the present invention.

Referring to FIG. 9, there is illustrated a signal flow diagram 900 which is used to help explain a scenario where a messaging server 402b (for example) wants to create a particular subscriber profile and interacts with a common directory 302a (for example) which can create that particular subscriber profile in accordance with one embodiment of the present invention. In this embodiment, the messaging server 402b wants to create a profile for a new subscriber and sends a create profile request which contains the new subscriber profile to the directory service logic 304' (step 1). Then, the directory service logic 304' sends a create index data request (containing the subscriber search keys including at least a local profile path and a last update URL) to the search index storage unit 308' (step 2). The search index storage unit 308' stores the subscriber search keys and sends an indication that the subscriber search keys have been properly stored to the directory service logic 304' (step 3) (note: the subscriber search keys will be replicated and stored in all of the remote search index storage units 308). Next, the directory service logic 304' sends a store request (using the local profile path) requesting that the subscriber profile be stored in the local profile storage unit 306' (step 4). The local profile storage unit 306' stores the subscriber profile and then sends an indication that the subscriber profile has been successfully stored to the directory service logic 304' (step 5). Thereafter, the directory service logic 304' sends a success indication to the messaging server 402b' (step 6).

Figure 10:
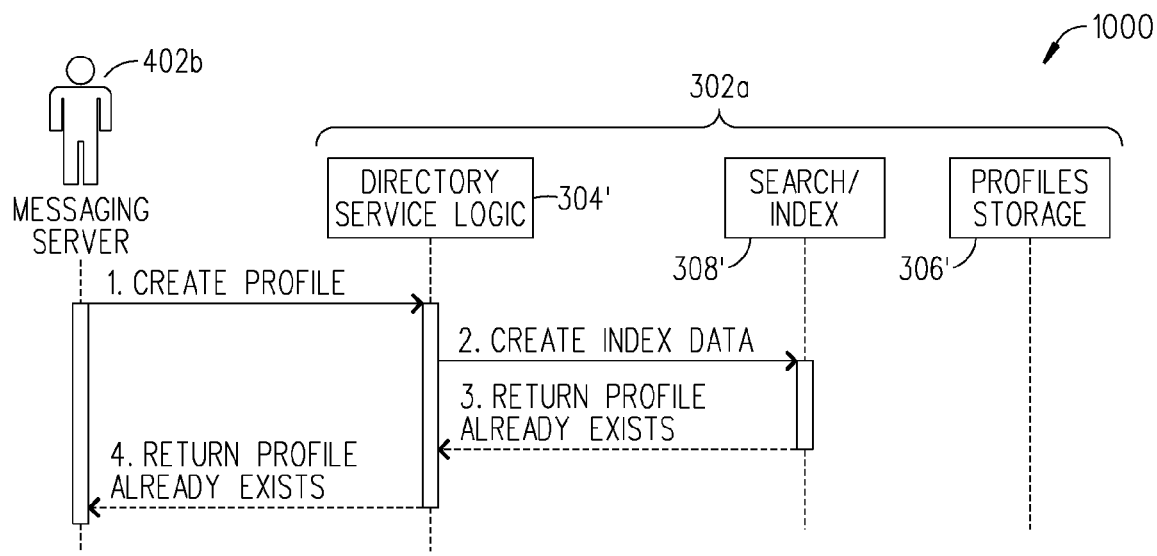

Referring to FIG. 10, there is illustrated a signal flow diagram 1000 which is used to help explain a scenario where a messaging server 402b (for example) wants to create a particular subscriber profile and interacts with a common directory 302a (for example) which determines that the particular subscriber profile has been previously created in accordance with an embodiment of the present invention. In this embodiment, the messaging server 402b wants to create a profile for a new subscriber and sends a create profile request which contains the new subscriber profile to the directory service logic 304' (step 1). Then, the directory service logic 304' sends a create index data request (containing the subscriber search keys including at least a local profile path and a last update URL) to the search index storage unit 308' (step 2). The search index storage unit 308' determines that the subscriber profile has previously been stored and sends a message indicating the same to the directory service logic 304' (step 3). Thereafter, the directory service logic 304' sends a message indicating that the subscriber profile already exists to the messaging server 402b' (step 4).

Figure 11:
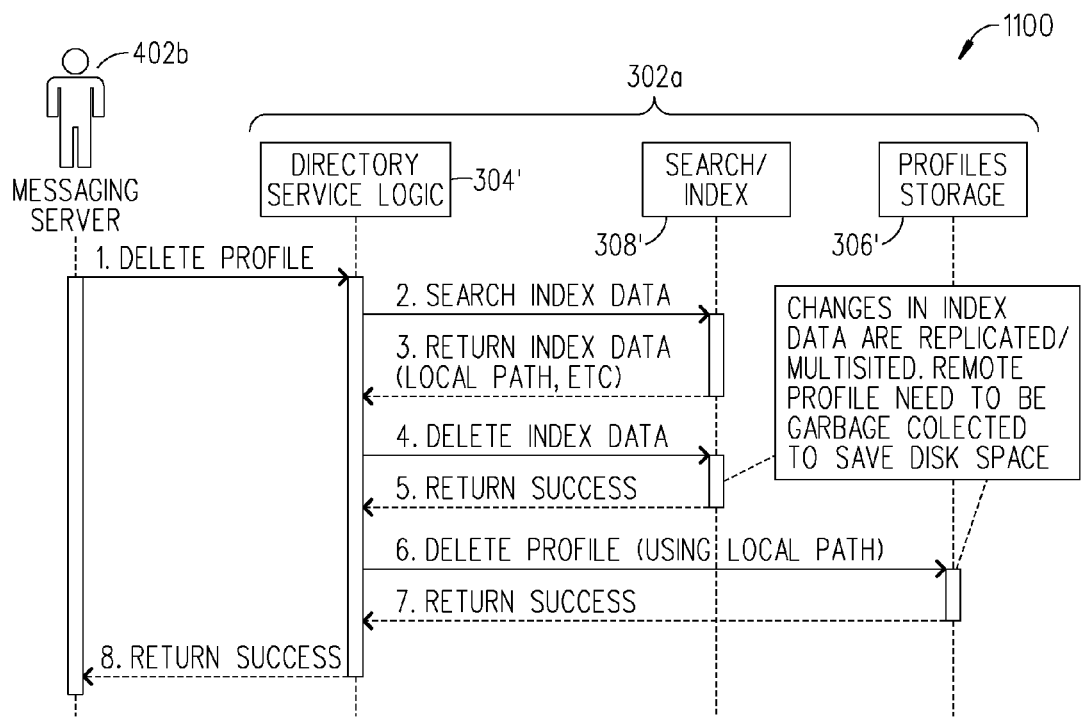
FIG. 11 is a single signal flow diagram which is used to help explain a scenario where a messaging server wants to delete a subscriber profile and interacts with a common directory which deletes the subscriber profile in accordance with another embodiment of the present invention.

Referring to FIG. 11, there is illustrated a signal flow diagram 1100 which is used to help explain a scenario where a messaging server 402b (for example) wants to delete a particular subscriber profile and interacts with a common directory 302a (for example) which then deletes that particular subscriber profile in accordance with one embodiment of the present invention. In this embodiment, the messaging server 402b wants to delete a profile for a particular subscriber and sends a delete profile request which contains a subscriber search key to the directory service logic 304' (step 1). Then, the directory service logic 304' sends a search index data request (containing the subscriber search key) to the search index storage unit 308' (step 2). The search index storage unit 308' performs the search and sends the subscriber search index data (local profile path, last update URL etc.) back to the directory service logic 304' (step 3). The directory service logic 304' then sends a delete search index data request (containing one of the subscriber search keys) to the search index storage unit 308' (step 4). The search index storage unit 308' deletes the subscriber search keys and sends a message indicating that the subscriber search keys have been deleted to the directory service logic 304' (step 5) (note: the subscriber search keys would also be deleted in all of the remote search index storage units 308). Next, the directory service logic 304' sends a delete profile request (including the local profile path) requesting that the subscriber profile be deleted from the local profile storage unit 306' (step 6). The local profile storage unit 306' deletes the subscriber profile and then sends a message indicating that the subscriber profile was successfully deleted to the directory service logic 304' (step 7) (note: it is possible that one or more remote local profile storage units 306 may still store this particular subscriber profile). Thereafter, the directory service logic 304' sends a message indicating that the subscriber profile has been deleted to the messaging server 402b' (step 8).

Figure 12:
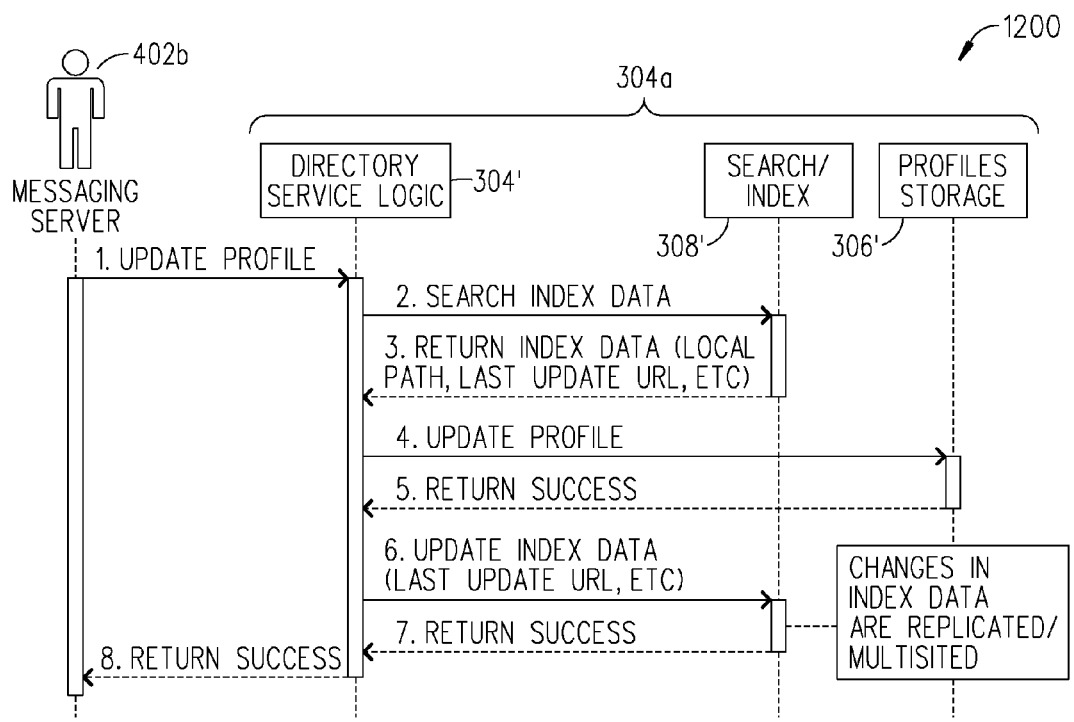
FIGS. 12-14 are three signal flow diagrams which are used to help explain a scenario where a messaging server wants to update a subscriber profile and interacts with a common directory which updates or attempts to update the subscriber profile in accordance with several different embodiments of the present invention.

Referring to FIG. 12, there is illustrated a signal flow diagram 1200 which is used to help explain a scenario where a messaging server 402b (for example) wants to update a particular subscriber profile and interacts with a common directory 302a (for example) which then updates that particular subscriber profile in accordance with one embodiment of the present invention. In this embodiment, the messaging server 402b wants to update a profile for a particular subscriber and sends an update profile request which contains the updated subscriber profile information (including one or more subscriber search keys) to the directory service logic 304' (step 1). Then, the directory service logic 304' sends a search index data request (containing the subscriber search key(s)) to the search index storage unit 308' which then performs a search to obtain the subscriber search index data (including a local profile path and a last update URL) (step 2). Then, the search index storage unit 308' sends the subscriber search index data (local profile path, last update URL etc.) to the directory service logic 304' (step 3). The directory service logic 304' sends an update profile request (including the local profile path and the updated subscriber information) to the local profile storage unit 306' (step 4). The local profile storage unit 306' uses the local profile path to access the previously stored subscriber profile and then updates the subscriber profile. Thereafter, the local profile storage unit 306' sends an update success message to the directory service logic 304' (step 5). The directory service logic 304' sends an update request (containing the last update URL etc. . . . ) requesting that the new version of the subscriber search keys namely the last update URL with the new timestamp be stored in the search index storage unit 308' (step 6). The search index storage unit 308' stores the new subscriber search keys including the last update URL with the new timestamp and sends an indication that this was successfully completed to the directory service logic 304' (step 7) (note: the changes to the subscriber search keys for this subscriber are replicated in all of the remote search index storage units 308). Thereafter, the directory service logic 304' sends an indication that the subscriber profile has been successfully updated to the messaging server 402b (step 8).

Figure 13:
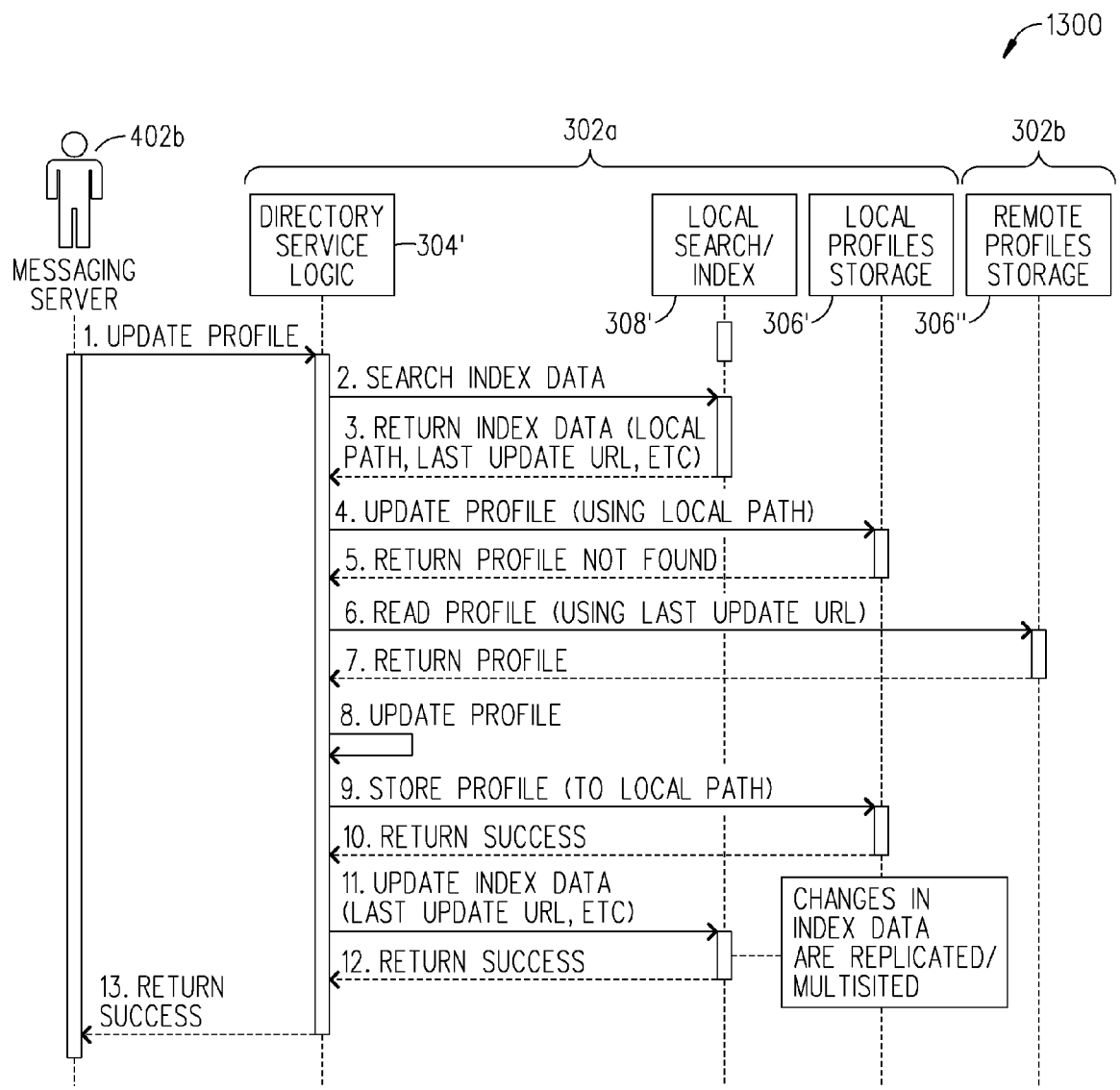

Referring to FIG. 13, there is illustrated a signal flow diagram 1300 which is used to help explain a scenario where a messaging server 402b (for example) wants to update a particular subscriber profile and interacts with a common directory 302a (for example) which then updates that particular subscriber profile in accordance with one embodiment of the present invention. In this embodiment, the messaging server 402b wants to update a profile for a particular subscriber and sends an update profile request which contains the updated subscriber profile information (including one or more subscriber search keys) to the directory service logic 304' (step 1). Then, the directory service logic 304' sends a search index data request (containing the subscriber search key(s)) to the search index storage unit 308' which then performs a search to obtain the search index data (including a local profile path, a last update URL etc. . . . ) (step 2). The search index storage unit 308' sends the search index data (including the local profile path, last update URL etc.) to the directory service logic 304' (step 3). The directory service logic 304' sends an update profile request (including the local profile path and the updated subscriber information) to the local profile storage unit 306' (step 4). The local profile storage unit 306' uses the local profile path in an attempt to access the subscriber profile but there is no stored subscriber profile and thus sends a reply message indicating that there is no stored subscriber profile to the directory service logic 304' (step 5). The directory service logic 304' sends a read request (including the last update URL) to the corresponding remote local profile storage unit 306' (note: the last update URL identifies this remote local profile storage unit 306" as being the one in which the latest version of the subscriber profile is stored) (step 6). The remote local profile storage unit 306" uses the last update URL to access the subscriber profile and then sends the subscriber profile to the directory service logic 304' (step 7). The directory service logic 304' updates the subscriber profile (step 8). Thereafter, the directory service logic 304' sends a store profile request (including the local profile path and the updated subscriber information) to the local profile storage unit 306' (step 9). The local profile storage unit 306' uses the local profile path to store the updated subscriber profile and then sends a success message to the directory service logic 304' (step 10). The directory service logic 304' sends an update request requesting that the last update URL with the new timestamp be stored in the search index storage unit 308' (step 11). The search index storage unit 308' stores the new subscriber search key namely the last update URL with the new timestamp and sends an indication that this was successfully completed to the directory service logic 304' (step 12) (note: the changes to the subscriber search keys for this subscriber are replicated in all of the remote search index storage units 308). Thereafter, the directory service logic 304' sends an indication that the subscriber profile was successfully updated to the messaging server 402b (step 13).

Figure 14:
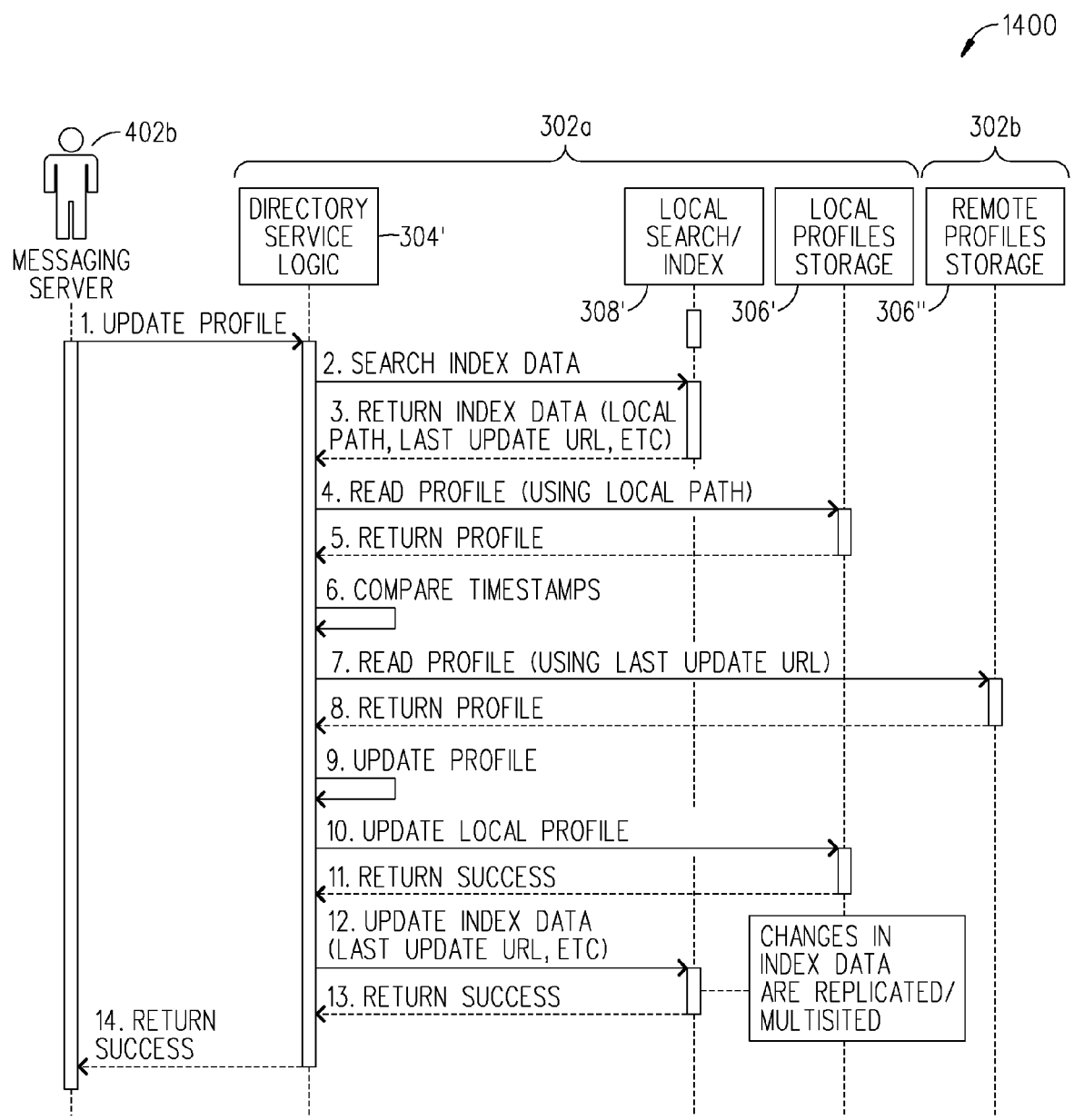

Referring to FIG. 14, there is illustrated a signal flow diagram 1400 which is used to help explain a scenario where a messaging server 402b (for example) wants to update a particular subscriber profile and interacts with a common directory 302a (for example) which then updates that particular subscriber profile in accordance with one embodiment of the present invention. In this embodiment, the messaging server 402b wants to update a profile for a particular subscriber and sends an update profile request which contains the updated subscriber profile information (including one or more subscriber search keys) to the directory service logic 304' (step 1). Then, the directory service logic 304' sends a search index data request (containing the subscriber search key(s)) to the search index storage unit 308' which then performs a search to obtain the subscriber search index data (including a local profile path, a last update URL etc. . . . ) (step 2). The search index storage unit 308' sends the search index data (including the local profile path, last update URL etc.) to the directory service logic 304' (step 3). The directory service logic 304' sends a read profile request (including the local profile path) to the local profile storage unit 306' (step 4). The local profile storage unit 306' uses the local profile path to access the subscriber profile and then sends the retrieved subscriber profile (including a last profile timestamp) to the directory service logic 304' (step 5) (note: the local profile storage unit 306' can also send or provide access only to the last profile timestamp). Then, the directory service logic 304' compares the timestamp in the last update URL (received from the search index storage unit 308') and the last profile timestamp (received from the local profile storage unit 306') to determine if the data in the returned subscriber profile is the most recent data (step 6). In this example, assume the last profile timestamp is older than the last update URL timestamp which indicates that the retrieved subscriber profile is not the most up to date subscriber profile (step 6). Then, the directory service logic 304' sends a read request (including the last update URL) to the corresponding remote local profile storage unit 306" (note: the last update URL identifies this remote local profile storage unit 306" as being the one in which the latest version of the subscriber profile is stored) (step 7). The remote local profile storage unit 306" uses the last update URL to access the subscriber profile and then sends the newer version of the subscriber profile to the directory service logic 304' (step 8). The directory service logic 304' updates the newer version of the subscriber profile (step 9). Then, the directory service logic 304' sends a store profile request (including the local profile path and the updated subscriber information) to the local profile storage unit 306' (step 10). The local profile storage unit 306' uses the local profile path to store the updated subscriber profile and then sends a success indication to the directory service logic 304' (step 11). The directory service logic 304' sends an update request (including the new last update URL) requesting that the last update URL with the new timestamp be stored in the search index storage unit 308' (step 12). The search index storage unit 308' stores the new subscriber search key which is the last update URL with the new timestamp and sends an indication that this was successfully completed to the directory service logic 304' (step 13) (note: the changes to the subscriber search keys for this subscriber are replicated in all of the remote search index storage units 308). Thereafter, the directory service logic 304' sends an indication that the subscriber profile was successfully updated to the messaging server 402*b* (step 14).

Figure 15:
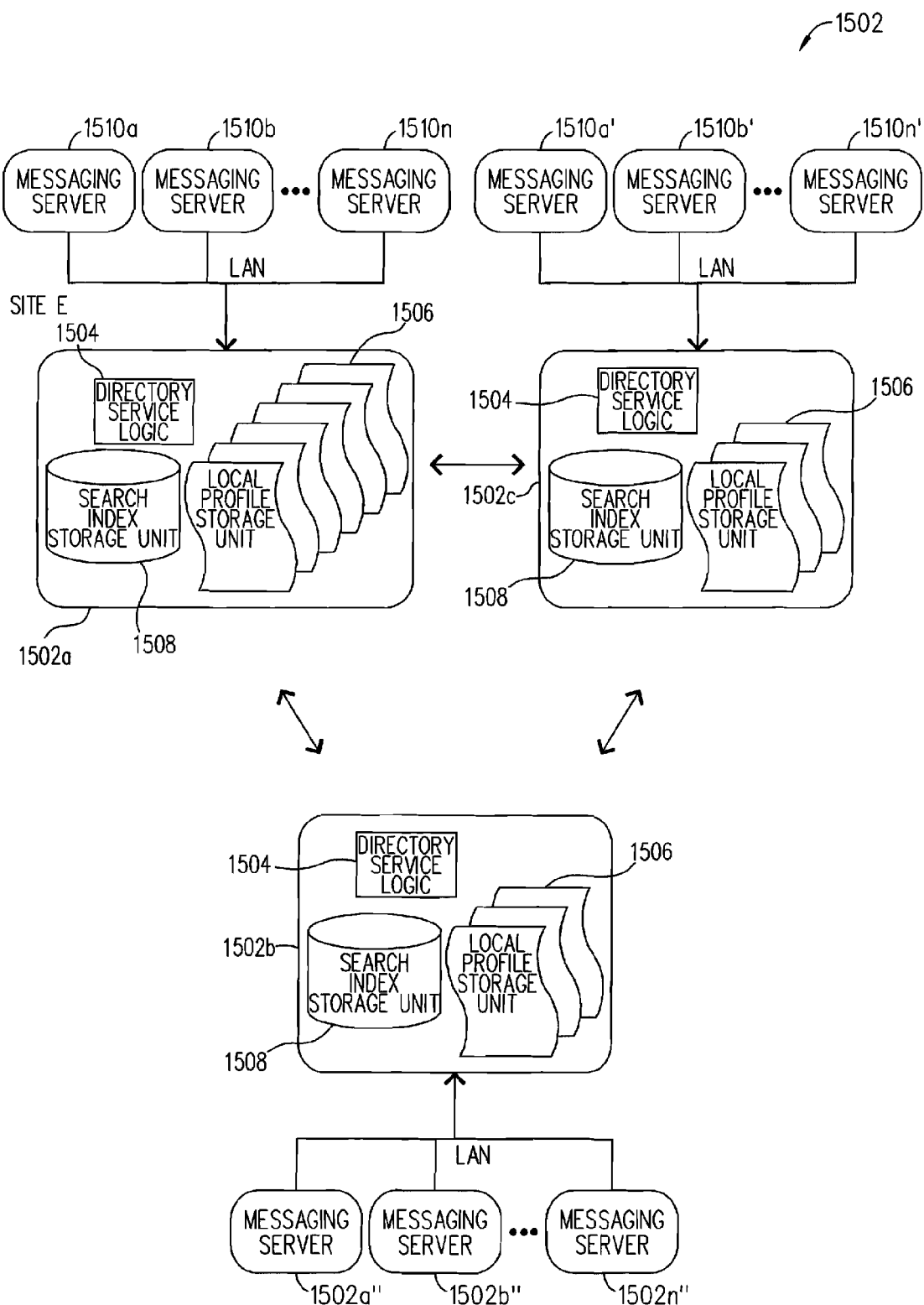
FIG. 15 is a block diagram illustrating a single common directory which has a scaled distributed subscriber database architecture in accordance with another embodiment of the present invention.

Referring to FIG. 15, there is a block diagram illustrating an exemplary common directory 1502 (shown at site E) which is used to help explain how one can scale the distributed subscriber database architecture in accordance with yet another embodiment of the present invention. As shown, the "scaled" common directory 1502 is made-up of multiple sub-common directories 1502*a*, 1502*b* and 1502*c* (only three shown) which interact with one another in the same manner as was described above with respect to the common directories 302*a* and 302*b*. The sub-common directories 1502*a*, 1502*b* and 1502*c* each include a directory service logic 1504, a local profile storage unit 1506 and a search index storage unit 1508. Plus, the sub-common directories 1502*a*, 1502*b* and 1502*c* are respectively connected via a LAN to a plurality of messaging servers 1510*a*, 1510*b* . . . 1510*n*, 1510*a*', 1510*b*' . . . 1510*n*' and 1510*a*'', 1510*b*'' . . . 1510*n*''. If desired, a multi-site common directory can include any number of the "non-scaled" common directories and/or the "scaled" common directories.

The present solution has the following advantages (for example):
  Reduce the operating expenses for the network operators.
  Provide robust and fast access to a very high number of subscriber profiles across a high number of sites.
  Does not require a WAN with a high bandwidth and low latency IP backbone. In contrast, the multi-site common directory can be implemented with a low bandwidth and a high latency WAN.
  Every site can access every subscriber's profile while the small sites which have a relatively small amount of hardware can still access every subscriber's profile.
  Enables more subscribers to be supported with the same amount of hardware/CPU per site plus it does not require more bandwidth when compared to traditional multi-site common directories.
  Enables more flexibility with the hardware and bandwidth which can be used at each particular site when compared to traditional multi-site common directories.
  Does not require the replication of all subscriber data to all of the sites to have robust and fast access to all subscriber profiles.
  Easy to deploy at multi-sites and it enables the fast deployment of a new site where only the search indexes database (~5% of subscriber data) is needed to get started.

The search index storage unit can be a LDAP database. And, the local profile storage unit can be any type of storage unit such as a file system or a database.

The search index storage unit can be searched very fast, and the fact that the local database contains all of the local subscriber profiles provides successful replies in most of the cases. And, when a site is interrogated for a non-local subscriber (e.g. roaming), the index search returns a successful result since it contains all information about all of the subscribers, but the full profile will likely not be found locally. In this case, the home network is interrogated to obtain the subscriber profile which is then stored in the local profile storage unit for future access.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the spirit of the invention as set forth and defined by the following claims.

The invention claimed is:

1. A common directory comprising:
  a directory service logic;
  a search index storage unit adapted to store subscriber search keys of all subscribers in a network; and
  a local profile storage unit adapted to store profiles of a portion of all subscribers in the network, the directory service logic being adapted to access subscriber profiles by interfacing with said search index storage unit and with said local profile storage unit, the stored subscriber search keys being automatically replicated at remote search index storage units associated with other common directories, and wherein the stored subscriber profiles are not automatically replicated at remote local profile storage units associated with the other common directories;
  wherein said directory service logic looks-up a specific subscriber profile by:
    sending a subscriber search key to said search index storage unit;
    receiving a local profile path and a last update URL from said search index storage unit;
    using the local profile path to send a request to read the specific subscriber profile stored within said local profile storage unit;
    receiving an indication that the specific subscriber profile is not stored within said local profile storage unit;
    using the last update URL to send a request to read the specific subscriber profile stored within one of said remote local profile storage units;
    receiving the specific subscriber profile from said one remote local profile storage unit;
    using the local profile path to have the specific subscriber profile stored within said local profile storage unit; and
    receiving an indication that the specific subscriber profile was successfully stored within said local profile storage unit.

2. The common directory of claim 1, wherein said search index storage unit stores at least one of the following subscriber search keys:
  a local profile path;
  a last update Uniform Resource Locator (URL) with a timestamp;
  a Mobile Subscriber Integrated Services Digital Network Number (MSISDN);

a second MSISDN;
a Session Initiation Protocol (SIP) Uniform Resource Identifier (URI);
an email address;
an alternative email address;
a billing number; and
a portability number.

3. The common directory of claim 1, wherein
the step of receiving an indication that the specific subscriber profile is not stored within said local storage unit includes receiving a local profile timestamp associated with the specific subscriber profile from said local profile storage unit; and
wherein the steps of using the last updated URL, receiving the specific subscriber profile, using the local profile path to have the specific subscriber profile stored, and receiving an indication that the specific subscriber profile was successfully stored are performed responsive to a comparison of the local profile timestamp to a timestamp associated with the last update URL that indicate that local profile timestamp is older than the timestamp associated with the last update URL.

4. The common directory of claim 1, wherein said directory service logic creates a specific subscriber profile by performing the following steps:
sending subscriber search keys including a local profile path and a last update URL to be stored in said search index storage unit, wherein the storing of the subscriber search keys in said search index storage unit is automatically replicated so the subscriber search keys are also stored within the remote search index storage units which are associated with the other common directories;
using the local profile path to send a request to store the specific subscriber profile within said local profile storage unit; and
receiving an indication that the specific subscriber profile has been stored within said local profile storage unit.

5. The common directory of claim 1, wherein said directory service logic attempts to create a specific subscriber profile by performing the following steps:
sending subscriber search keys including a local profile path and a last update URL to be stored in said search index storage unit; and
receiving an indication that the subscriber search keys have previously been stored within said search index storage unit.

6. The common directory of claim 1, wherein said directory service logic deletes a specific subscriber profile by performing the following steps:
sending a subscriber search key to said search index storage unit;
receiving a local profile path and a last update URL from said search index storage unit;
sending a request to delete the subscriber search keys and other associated subscriber search keys from said search index storage unit, wherein the deletion of the subscriber search keys in said search index storage unit is automatically replicated so the subscriber search keys are also deleted in the remote search index storage units which are associated with the other common directories;
using the local profile path to send a request to delete the specific subscriber profile from said local profile storage unit; and
receiving an indication that the specific subscriber profile has been successfully deleted from said local profile storage unit.

7. The common directory of claim 1, wherein said directory service logic updates a specific subscriber profile by performing the following steps:
sending a subscriber search key to said search index storage unit;
receiving a local profile path and a last update URL from said search index storage unit;
using the local profile path to update the specific subscriber profile stored within said local profile storage unit;
receiving an indication that the specific subscriber profile has been successfully updated within said local profile storage unit;
sending a new last update URL with a new timestamp to be stored within said search index storage unit, wherein the storing of the new last update URL in said search index storage unit is automatically replicated so the new last update URL is also stored within the remote search index storage units which are associated with the other common directories; and
receiving an indication that the new last update URL has been successfully stored within said search index storage unit.

8. The common directory of claim 1, wherein said directory service logic updates a specific subscriber profile by performing the following steps:
sending a subscriber search key to said search index storage unit;
receiving a local profile path and a last update URL from said search index storage unit;
using the local profile path to update the specific subscriber profile stored within said local profile storage unit;
receiving an indication that the specific subscriber profile is not stored within said local profile storage unit;
using the last update URL to send a request to read the specific subscriber profile stored within one of said remote local profile storage units;
receiving the specific subscriber profile from said one remote local profile storage unit;
updating the specific subscriber profile;
using the local profile path to have the updated specific subscriber profile stored within said local profile storage unit;
receiving an indication that the updated specific subscriber profile was successfully stored within said local profile storage unit;
sending a new last update URL with a new timestamp to be stored within said search index storage unit, wherein the storing of the new last update URL in said search index storage unit is automatically replicated so the new last update URL is also stored within the remote search index storage units which are associated with the other common directories; and
receiving an indication that the new last update URL has been successfully stored within said search index storage unit.

9. The common directory of claim 1, wherein said directory service logic updates a specific subscriber profile by performing the following steps:
sending a subscriber search key to said search index storage unit;
receiving a local profile path and a last update URL from said search index storage unit;
using the local profile path to send a request to read the specific subscriber profile stored within said local profile storage unit;

receiving at least a local profile timestamp associated with the specific subscriber profile from said local profile storage unit;

comparing the local profile timestamp to a timestamp associated with the last update URL and if the local profile timestamp is older than the timestamp associated with the last update URL then perform the following steps:

using the last update URL to send a request to read the specific subscriber profile stored within one of said remote local profile storage units;

receiving the specific subscriber profile from said one remote local profile storage unit;

updating the specific subscriber profile;

using the local profile path to have the updated specific subscriber profile stored within said local profile storage unit;

receiving an indication that the updated specific subscriber profile was successfully stored within said local profile storage unit;

sending a new last update URL with a new timestamp to be stored within said search index storage unit, wherein the storing of the new last update URL in said search index storage unit is automatically replicated so the new last update URL is also stored within the remote search index storage units which are associated with the other common directories; and receiving an indication that the new last update URL has been successfully stored within said search index storage unit.

10. The common directory of claim 1, further comprising multiple sub-common directories each of which has a directory service logic, a search index storage unit and a local profile storage unit.

11. A method for accessing and maintaining a plurality of subscriber profiles, said method comprising the steps of:

storing a plurality of subscriber search keys for all subscribers within a search index storage unit, wherein said stored subscriber search keys are automatically replicated at remote search index storage units which are associated with other common directories;

storing subscriber profiles for a portion of the subscribers within a local profile storage unit, wherein said stored subscriber profiles are not automatically replicated at remote local profile storage units which are associated with the other common directories; and looking up a specific subscriber profile using a directory service by sending a subscriber search key to said search index storage unit;

receiving a local profile path and a last update URL from said search index storage unit;

using the local profile path to send a request to read the specific subscriber profile stored within said local profile storage unit;

receiving an indication that the specific subscriber profile is not stored within said local profile storage unit;

using the last update URL to send a request to read the specific subscriber profile stored within one of said remote local profile storage units;

receiving the specific subscriber profile from said one remote local profile storage unit;

using the local profile path to have the specific subscriber profile stored within said local profile storage unit; and receiving an indication that the specific subscriber profile was successfully stored within said local profile storage unit.

12. The method of claim 11, wherein said search index storage unit stores at least one of the following subscriber search keys:

a local profile path;

a last update Uniform Resource Locator (URL) with a timestamp;

a Mobile Subscriber Integrated Services Digital Network Number (MSISDN);

a second MSISDN;

a Session Initiation Protocol (SIP) Uniform Resource Identifier (URI);

an email address;

an alternative email address;

a billing number; and a portability number.

13. The method of claim 11, wherein the step of receiving an indication that the specific subscriber profile is not stored within said local storage unit includes receiving a local profile timestamp associated with the specific subscriber profile from said local profile storage unit; and wherein the steps of using the last updated URL, receiving the specific subscriber profile, using the local profile path to have the specific subscriber profile stored, and receiving an indication that the specific subscriber profile was successfully stored are performed responsive to a comparison of the local profile timestamp to a timestamp associated with the last update URL that indicate that local profile timestamp is older than the timestamp associated with the last update.

14. The method of claim 11, wherein a directory service logic creates a specific subscriber profile by performing the following steps:

sending subscriber search keys including a local profile path and a last update URL to be stored in said search index storage unit, wherein the storing of the subscriber search keys in said search index storage unit is automatically replicated so the subscriber search keys are also stored within the remote search index storage units which are associated with the other common directories;

using the local profile path to send a request to store the specific subscriber profile within said local profile storage unit; and receiving an indication that the specific subscriber profile has been stored within said local profile storage unit.

15. The method of claim 11, wherein a directory service logic attempts to create a specific subscriber profile by performing the following steps:

sending subscriber search keys including a local profile path and a last update URL to be stored in said search index storage unit; and receiving an indication that the subscriber search keys have previously been stored within said search index storage unit.

16. The method of claim 11, wherein a directory service logic deletes a specific subscriber profile by performing the following steps:

sending a subscriber search key to said search index storage unit;

receiving a local profile path and a last update URL from said search index storage unit;

sending a request to delete the subscriber search keys and other associated subscriber search keys from said search index storage unit, wherein the deletion of the subscriber search keys in said search index storage unit is automatically replicated so the subscriber search keys are also deleted in the remote search index storage units which are associated with the other common directories;

using the local profile path to send a request to delete the specific subscriber profile from said local profile storage unit; and receiving an indication that the specific subscriber profile has been successfully deleted from said local profile storage unit.

17. The method of claim 11, wherein a directory service logic updates a specific subscriber profile by performing the following steps:

sending a subscriber search key to said search index storage unit;

receiving a local profile path and a last update URL from said search index storage unit;

using the local profile path to update the specific subscriber profile stored within said local profile storage unit;

receiving an indication that the specific subscriber profile has been successfully updated within said local profile storage unit;

sending a new last update URL with a new timestamp to be stored within said search index storage unit, wherein the storing of the new last update URL in said search index storage unit is automatically replicated so the new last update URL is also stored within the remote search index storage units which are associated with the other common directories; and receiving an indication that the new last update URL has been successfully stored within said search index storage unit.

18. The method of claim 11, wherein a directory service logic updates a specific subscriber profile by performing the following steps:

sending a subscriber search key to said search index storage unit;

receiving a local profile path and a last update URL from said search index storage unit;

using the local profile path to update the specific subscriber profile stored within said local profile storage unit;

receiving an indication that the specific subscriber profile is not stored within said local profile storage unit;

using the last update URL to send a request to read the specific subscriber profile stored within one of said remote local profile storage units;

receiving the specific subscriber profile from said one remote local profile storage unit;

updating the specific subscriber profile;

using the local profile path to have the updated specific subscriber profile stored within said local profile storage unit;

receiving an indication that the updated specific subscriber profile was successfully stored within said local profile storage unit;

sending a new last update URL with a new timestamp to be stored within said search index storage unit, wherein the storing of the new last update URL in said search index storage unit is automatically replicated so the new last update URL is also stored within the remote search index storage units which are associated with the other common directories; and receiving an indication that the new last update URL has been successfully stored within said search index storage unit.

19. The method of claim 11, wherein a directory service logic updates a specific subscriber profile by performing the following steps:

sending a subscriber search key to said search index storage unit;

receiving a local profile path and a last update URL from said search index storage unit;

using the local profile path to send a request to read the specific subscriber profile stored within said local profile storage unit;

receiving at least a local profile timestamp associated with the specific subscriber profile from said local profile storage unit;

comparing the local profile timestamp to a timestamp associated with the last update URL and if the local profile timestamp is older than the timestamp associated with the last update URL then perform the following:

using the last update URL to send a request to read the specific subscriber profile stored within one of said remote local profile storage units;

receiving the specific subscriber profile from said one remote local profile storage unit;

updating the specific subscriber profile;

using the local profile path to have the updated specific subscriber profile stored within said local profile storage unit;

receiving an indication that the updated specific subscriber profile was successfully stored within said local profile storage unit;

sending a new last update URL with a new timestamp to be stored within said search index storage unit, wherein the storing of the new last update URL in said search index storage unit is automatically replicated so the new last update URL is also stored within the remote search index storage units which are associated with the other common directories; and receiving an indication that the new last update URL has been successfully stored within said search index storage unit.

\* \* \* \* \*